United States Patent [19]

Hawkinson

[11] Patent Number: 4,942,653
[45] Date of Patent: Jul. 24, 1990

[54] PRODUCTION METHOD FOR A CHANNELED WALL THRUST NOZZLE

[75] Inventor: Elden L. Hawkinson, West Hills, Calif.

[73] Assignee: Rockwell International Corporation, El Segundo, Calif.

[21] Appl. No.: 398,552

[22] Filed: Aug. 25, 1989

[51] Int. Cl.$^5$ .................... B21D 53/00; B22D 19/14; B28B 21/42
[52] U.S. Cl. .................... 29/890.01; 29/DIG. 29; 29/423; 164/98; 164/112; 249/174; 249/176; 249/177; 264/221; 264/277; 264/317
[58] Field of Search ......... 29/157 C, 157 R, DIG. 29; 60/270.1, 271, 267; 164/98, 112; 249/57, 63, 64, 129, 132, 142, 160, 175, 176, 177, 184; 264/221, 317, 277; 425/DIG. 225, DIG. 226, DIG. 227

[56] References Cited

U.S. PATENT DOCUMENTS

| 3,349,464 | 10/1967 | Becker, Jr. et al. | 29/157 C |
| 3,529,054 | 9/1970 | Hepner | 264/277 X |
| 3,613,207 | 10/1971 | Malburg | 29/157 C |
| 3,692,637 | 9/1972 | Dederra et al. | 29/157 C X |
| 4,584,171 | 4/1986 | Niino et al. | 29/157 C X |
| 4,707,225 | 11/1987 | Schuler et al. | 29/157 C X |

FOREIGN PATENT DOCUMENTS 843923  8/1960  United Kingdom ............ 29/157 C

OTHER PUBLICATIONS

"Liquid Rockets and Propellants", Bollinger et al., Academic Press, New York, 1960, pp. 563-583.

Primary Examiner—Joseph M. Gorski
Assistant Examiner—Peter Vo
Attorney, Agent, or Firm—H. Fredrick Hamann; Harry B. Field; Steven E. Kahm

[57] ABSTRACT

An improved method of manufacture is provided for producing a channeled wall thrust nozzle (10) of the type used to define a thrust chamber (12) in a jet or rocket engine. The method utilizes a precision formed mandrel (20) having an external geometry conforming generally to the converging-diverging shape of the desired thrust chamber (12), and further including longitudinally extending slots (24) for receiving channel separation ribs (26) which may be formed by die cutting from sheet stock. The channel spaces (16) between the separator ribs (26) are filled with a removable casting material (30) such as wax, and an outer housing shell (32) for the thrust nozzle is mounted about and secured to the separator ribs. The mandrel (20), which is transversely split at the throat of the thrust chamber (12), is then removed to expose the radially inboard margins of the separator ribs (26) for precision machining, followed by mounting of an inner housing shell (34) to the separator ribs. The casting material (30) is then removed from the resultant thrust nozzle (10) to leave precision process fluid channels (16) formed between the inner and outer housing shells.

18 Claims, 4 Drawing Sheets 4,942,653

PRODUCTION METHOD FOR A CHANNELED WALL THRUST NOZZLE

STATEMENT OF GOVERNMENT INTEREST

The Government has rights to this invention pursuant to Contract FO4611-87-C-0083 awarded by the U.S. Department of Air Force.

BACKGROUND OF THE INVENTION

This invention relates generally to improvements in manufacturing processes for making thrust chambers of the type used in jet or rocket engines. More particularly, this invention relates to an improved and relatively economical yet precision production method for making thrust chambers of the type having a channeled wall defining a converging-diverging thrust chamber.

Thrust chambers for jet and rocket engines are well known in the art for use in the combustion of fuels with an oxidizer and for discharging combustion products from the engine in a manner generating substantial thrust. Such thrust chambers define a converging-diverging geometry through which the combustion products are generated and flow to provide the desired forward reaction force or thrust. In many current thrust chamber designs, a channeled wall configuration is used wherein relatively small fluid flow channels are formed circumferentially about the thrust chamber for passage of an engine process fluid in heat exchange relation with combustion products. Such channeled wall configurations are used when heating of the process fluid and/or cooling of the thrust nozzle structure is desired for achieving higher engine performance levels and/or extended service life of the thrust chamber/nozzle structure.

While channeled wall thrust nozzles offer significant advantages in engine operation, the channeled wall structure is relatively difficult and costly to manufacture particularly in combination with the converging-diverging geometry of the thrust chamber. Moreover, in some engine applications, the array of fluid flow channels must have a substantially uniform size and shape within close tolerance limits for proper heat exchange operation. To meet these design criteria, such channeled wall thrust nozzles have in the past been produced from a forged thrust chamber liner of the desired converging-diverging shape, wherein this liner is appropriately machined to form longitudinally extending external channels of uniform size and shape which follow the converging-diverging contour. These machined channels are then enclosed by an outer wraparound housing shell. However, the requirement for precision channel machining on each thrust nozzle significantly increases the time and cost of production.

There exists, therefore, a need for improvements in production methods for manufacturing channeled wall thrust nozzles, wherein process fluid flow channels are formed with relatively high precision while avoiding costly and complex machining steps. The present invention fulfills these needs and provides further related advantages.

SUMMARY OF THE INVENTION

An improved process is provided for precision manufacture of channeled wall thrust chamber nozzles of the type used in jet and rocket engines and the like. The thrust nozzle is produced in a manner consistent with relatively high production rates to include a circumferential array of relatively small and substantially uniformly sized flow channels surrounding a thrust chamber of converging-diverging geometry. These flow channels permit circulation of a selected engine process fluid, such as fuel or oxidizer, in heat transfer relation with engine combustion products expelled through the thrust chamber.

In accordance with the invention, a precision formed and dimensionally stable mandrel is constructed to have a generally circular transverse cross-sectional shape, and a converging-diverging cross-section in the longitudinal dimension. The converging-diverging shape conforms generally to the geometry of the desired thrust chamber, with the mandrel preferably having a diametric size slightly less than the finished diametric size of the thrust chamber. Longitudinally extending slots are precision formed in the exterior of the mandrel to define the location of a plurality of radially extending walls separating the fluid flow channels. Moreover, the mandrel is transversely split at a plane corresponding with the throat of the thrust chamber.

A plurality of contoured channel separation ribs are formed from a suitable alloy material by die cutting or stamping from sheet stock or the like. These channel separator ribs are mounted individually within the exterior slots of the mandrel. The longitudinally extending spaces or channels disposed between the separator ribs are filled with a selected removable casting material, such as a casting wax. Following this filling step, an outer housing shell is mounted about the separator ribs and casting material to provide an outboard wall for the thrust chamber nozzle, with the outer housing shell being joined to the separator ribs.

The separable components of the split mandrel are then removed to expose the radially inboard margins of the separator ribs. These inboard margins are machined quickly and easily in accordance with the thrust chamber shape and to bridge at least slightly into the casting material. An inner housing shell is then mounted within and is joined to the separator ribs to define an inboard wall for the thrust nozzle, and the casting material is removed. The resultant thrust nozzle includes precision formed channels defined by the separator ribs in combination with the outer and inner housing shells, with the inner housing shell further defining the thrust chamber.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
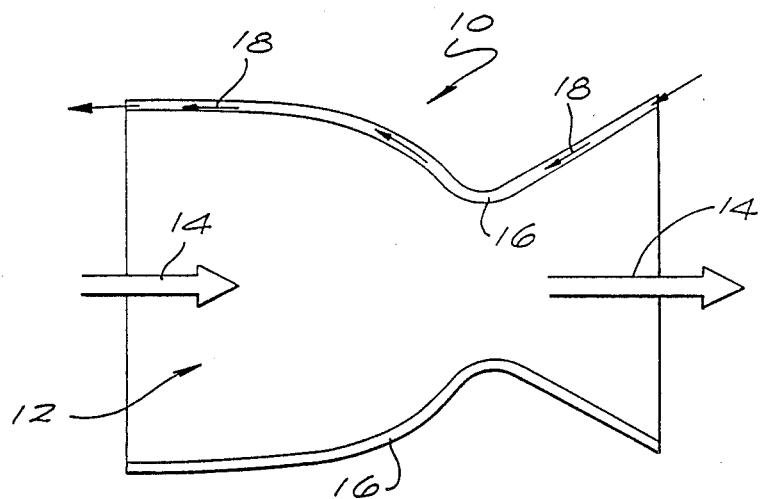
FIG. 1 is a schematic representation of a channeled wall thrust chamber nozzle formed in accordance with the invention and including process fluid flow in heat exchange relation with combustion products expelled through a thrust chamber.

As shown in the exemplary drawings, an improved production method is provided for the manufacture of a channeled wall thrust chamber nozzle of the type utilized in jet and rocket engines, wherein such thrust chamber nozzle is referred to generally in FIG. 1 by the reference numeral 10. The improved production method is designed for relatively economical yet precision formation of the thrust chamber nozzle 10 to include a specifically geometried converging- diverging thrust chamber 12 through which engine combustion products referenced by arrow 14 are expelled to generate substantial thrust. The thrust nozzle 10 further defines an array of relatively small fluid flow channels 16 arranged in a circumferential array about the thrust chamber 12 for circulation passage of an engine process fluid as referenced by arrows 18 in heat transfer association with the hot combustion products. Importantly, the invention provides a series of manufacturing steps for forming these process fluid channels 16 with substantial close tolerance precision while avoiding the need for traditional costly and complex channel machining operations to be performed on each thrust nozzle.

Channeled wall thrust chamber nozzles of the type depicted in FIG. 1 are known for use in relatively high performance jet engines and rocket engines, wherein engine performance levels are enhanced by circulating the engine process fluid in regenerative heat transfer relation with hot combustion products passing through the thrust chamber 12. In this regard, the process fluid may comprise fuel or oxidizer, with the process fluid extracting heat from the combustion products and simultaneously cooling the thrust chamber nozzle walls defining the converging-diverging thrust chamber. For proper operation, however, uniform formation of the process fluid channels 16 can be critical to insure substantially uniform fluid flow and heat extraction with respect to each channel. The present invention provides an improved process for producing thrust nozzles of this type at relatively increased production rates and significantly reduced production costs.

Figure 2:
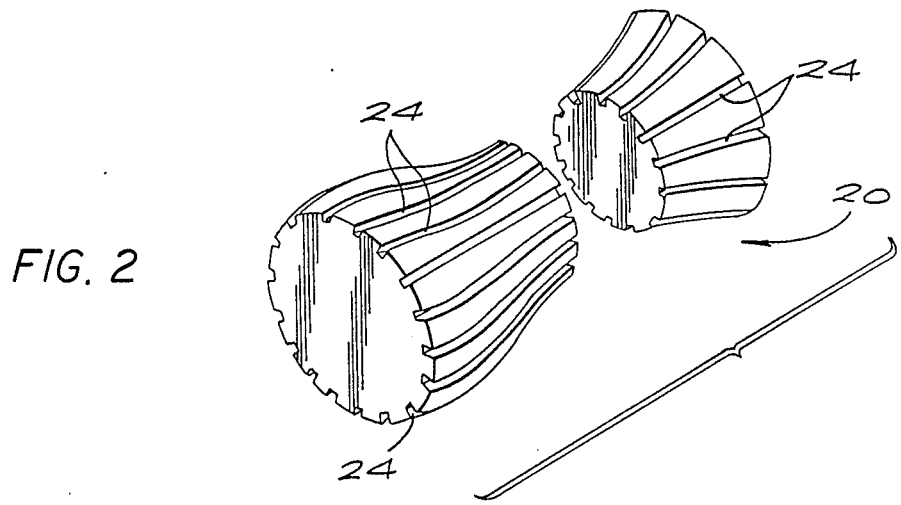
FIG. 2 is an exploded perspective view illustrating a transversely split mandrel for use in the thrust chamber nozzle production method embodying the present invention.

The channel wall thrust nozzle 10 is constructed with the use of a mandrel 20, as viewed in FIG. 2. This mandrel 20 is formed from a selected metal or composite material or the like as by machining with relatively close tolerances. The particular mandrel material is desirably selected for relative dimensional stability, including thermal stability throughout normal processing temperatures which conveniently correspond with ambient air temperatures ranging typically on the order of about 60°-100° F. Importantly, although the mandrel 20 is constructed with precision tolerances, the mandrel is reusable in the production of a succession of thrust nozzles without requiring complex or costly close tolerance machining operations to be performed on each thrust chamber nozzle.

Figure 3:
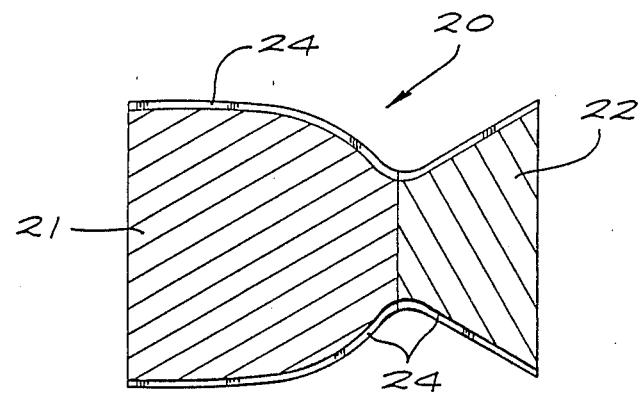
FIG. 3 is a longitudinal sectional view of the mandrel shown in FIG. 2.

As shown in FIGS. 2 and 3, the mandrel 20 has a generally cylindrical size and shape to define a circular transverse cross-section. In the longitudinal direction, the diametric size of the mandrel is contoured for general conformance with the geometry of the thrust chamber 12 to be constructed. That is, the mandrel 20 has a diametric size which smoothly diminishes or converges from one end to define the upstream converging portion of the thrust chamber, and then smoothly increases or diverges from a narrow throat to define the downstream diverging portion of the thrust chamber nozzle. For reasons to become more apparent in the following description, the diametric size of the mandrel from end to end is slightly less than the diametric size of the corresponding thrust chamber to be formed. Importantly, at the narrow throat, the mandrel 20 is transversely split to define longitudinally separable mandrel components 21 and 22.

The exterior periphery of the mandrel 20 is shaped by precision machining or the like to define an array of longitudinally extending shallow slots 24. These slots 24 are desirably formed identical to each other and with uniform circumferential spacing. The slots 24 follow the exterior contour of the mandrel 20, typically with uniform depth, from one end of the mandrel to the other. Accordingly, the slots 24 transition smoothly over the converging mandrel component 21 and then extend smoothly without interruption over the diverging mandrel component 22.

Figure 4:
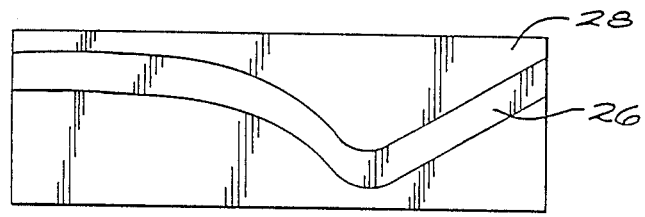
FIG. 4 is an elevational view depicting formation of a channel separator rib from sheet stock.

As shown in FIG. 4, channel separator ribs 26 are conveniently formed from appropriate metal sheet stock 28 or the like to have contoured longitudinal edge margins which generally conform to the converging-diverging geometry of the mandrel 20. These channel separator ribs 26 are formed from a selected material having relatively high thermal conductivity such as copper, copper alloy, or other metal material preferably having a substantially uniform sheet thickness. The ribs 26 can be formed in production quantities by die cutting or stamping, with multiple ribs 26 typically being cut from a single sheet of material. Mechanical or chemical deburring of the cut edge/margins of the separator ribs 26 is normally desired.

Figure 5:
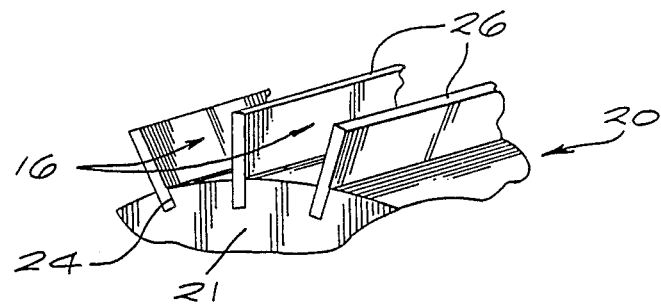
FIG. 5 is an enlarged fragmented perspective view showing mounting of a plurality of separator ribs onto the mandrel.
Figure 6:
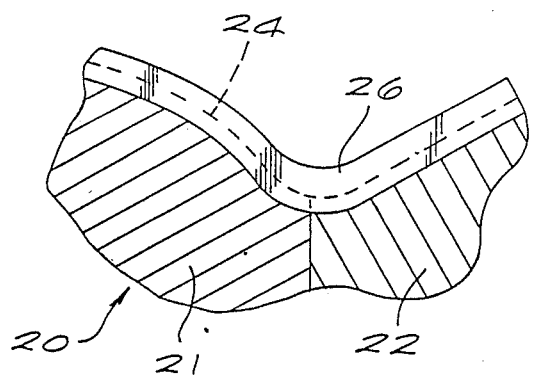
FIG. 6 is an enlarged fragmented longitudinal sectional view similar to a portion of FIG. 3, but depicting separator rib mounting onto the mandrel.
Figure 7:
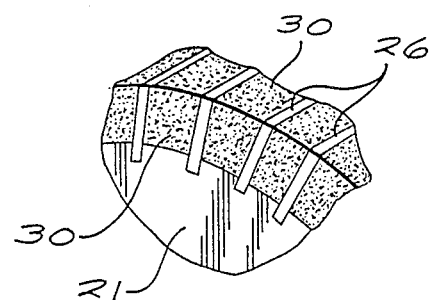
FIG. 7 is an enlarged fragmented perspective view illustrating a casting material filling channels defined between separator ribs on the mandrel.

The channel separator ribs 26 are seated individually within the mandrel slots 24 to form radially oriented walls defining the process fluid flow channels 16 therebetween, as viewed in FIG. 5. In this regard, the radially inboard edge margins of the separator ribs 26 are anchored within the mandrel slots 24, such that the outboard margins of the ribs terminate at diametric positions disposed outwardly from the mandrel (FIGS. 5 and 6). The longitudinally extending channels 16 between the ribs 26 are then filled with a suitable removable casting material 30 such as a casting wax, as shown in FIG. 7. The outer geometry of the resultant subassembly, including the mandrel 20, the ribs 26 and the casting material 30, is then shaped to a precision converging-diverging contour by relatively easy machining or the like.

Figure 8:
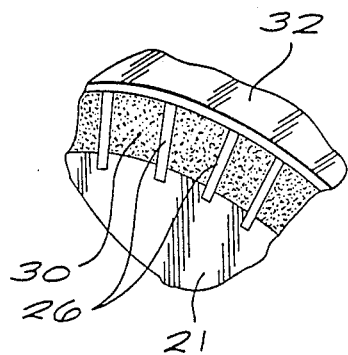
FIG. 8 is an enlarged fragmented perspective view similar to FIG. 7, but illustrating mounting of an outer housing shell about and joined with the separator ribs.

An outer housing shell 32 (FIG. 8) is then applied to the subassembly to enclose the outboard side of the process fluid channels 16 and to define an outboard wall for the thrust nozzle 10. This outer housing shell 32 is normally formed from a high strength structural material, such as nickel based alloy or the like, in accordance with various manufacturing processes such as electrodeposition, or by structural mounting of preformed housing components formed from selected sheet material or the like. Importantly, the outer housing shell 32 is joined to the outboard edge margin of each separator rib 26. When preformed sheet material components are used to form the outer shell, such joining step may be performed by welding, diffusion bonding, etc.

Figure 9:
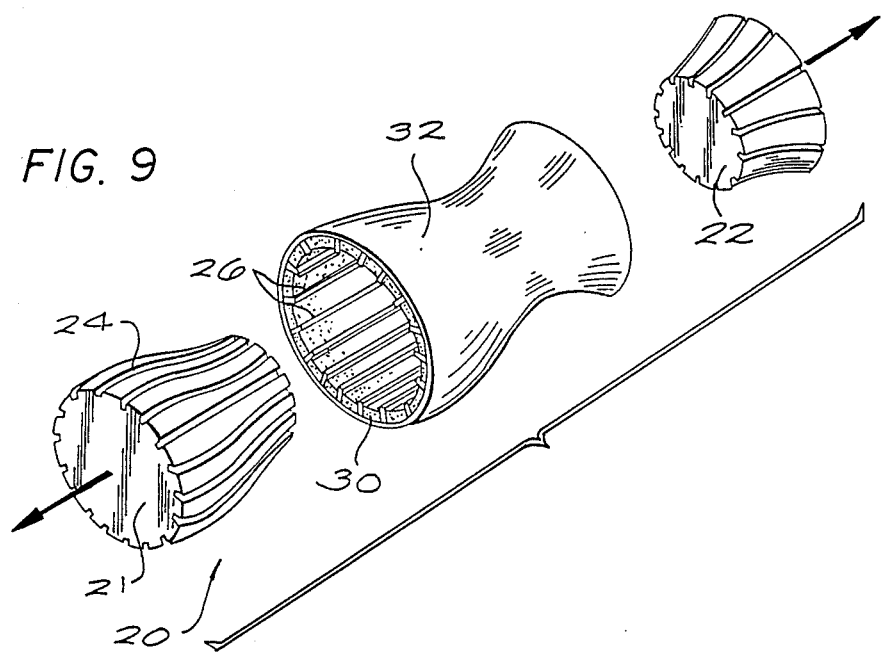
FIG. 9 is an exploded perspective view depicting removal of the mandrel from the separator ribs with the outer housing shell mounted thereon.
Figure 10:
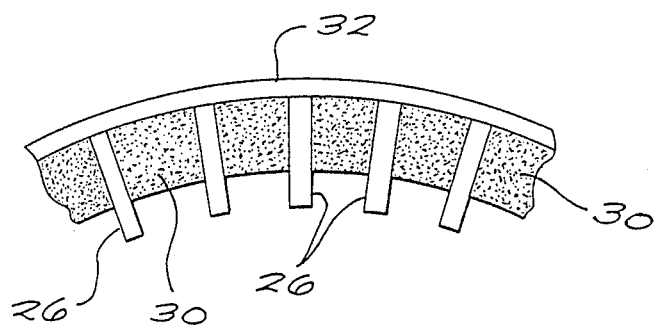
FIG. 10 is an enlarged fragmented end elevational view showing the partially formed thrust nozzle of FIG. 9 with the mandrel removed.

As shown in FIGS. 9 and 10, subsequent to formation of the outer housing shell 32, the mandrel 20 is separated from the partially formed thrust nozzle. Such separation of the mandrel 20 is accomplished quickly and easily by axial separation of the mandrel components 21 and 22. The converging-diverging geometry or the ribs 26 permits this separation without binding of components. Frictional resistance to separation can be minimized by precoating the mandrel 20 with a suitable release agent prior to placement of the ribs 26.

Figure 11:
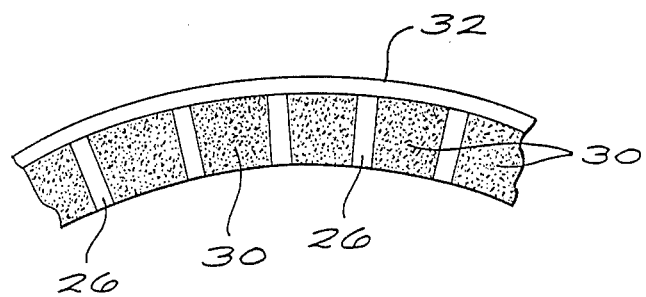
FIG. 11 is an enlarged fragmented end elevational view similar to FIG. 10, but illustrating the separator ribs with precision machined inboard edge margins.
Figure 12:
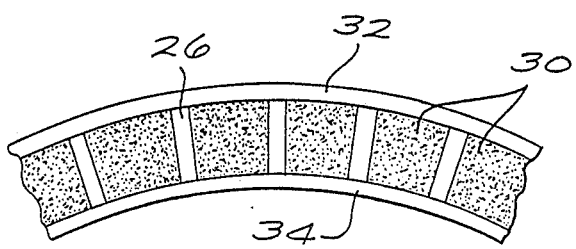
FIG. 12 is an enlarged fragmented end elevational view similar to FIG. 11, and depicting an inner housing shell mounted onto and joined with the separator ribs.
Figure 13:
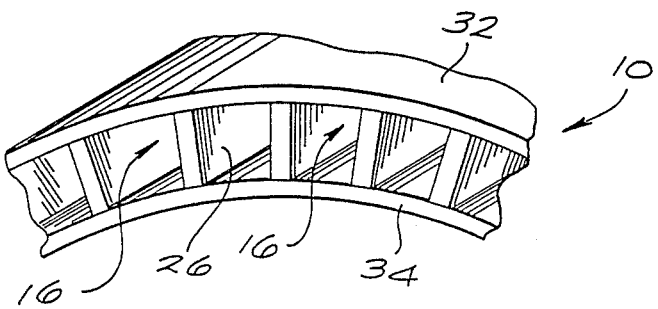
FIG. 13 is a fragmented perspective view of a portion of the thrust chamber nozzle, showing the channels with the casting material removed therefrom.

Subsequent to removal of the mandrel, the inboard edge margins of the separator ribs 26 are exposed (FIGS. 9 and 10). These inboard rib edges are shaped to a precision converging-diverging contour by relatively easy machining or the like. For ease of production with relatively close tolerances, the ribs 26 are machined to bridge at least slightly into the casting material 30, as shown in FIG. 11, thereby defining a precision inboard surface. An inner housing shell 34 of a selected material such as a copper or copper alloy having high thermal conductivity is then formed to line the interior of the nozzle subassembly, as viewed in FIG. 12. This inner shell 34 may also be formed by electrodeposition, or other suitable wall forming techniques. Importantly, the inner shell 34 is also joined to the edges of the separator ribs 26, such that the inner and outer housing shells 34 and 32 cooperate with the separator ribs 26 to define and enclose the longitudinal process fluid channels 16. The casting material 30 is then removed from the channels 16 by melting and/or solvent flushing to form the finished thrust nozzle structure as depicted in FIG. 13.

The finished thrust nozzle 10 is appropriately equipped with manifolds (not shown) for circulating the process fluid to and from the circumferential array of channels 16 during engine operation, as depicted by arrows 18 in FIG. 1.

The improved production method of the present invention thus provides a rapid and relatively economical technique for precision formation of the channeled wall thrust nozzle. Complex machining of precision contoured channels is not required. Instead, a preformed mandrel is used as the nozzle base, wherein this mandrel includes precision channels but is reusable in the production of a succession of thrust nozzles.

A variety of modifications and improvements to the production method described herein will be apparent to those skilled in the art. Accordingly, no limitation on the invention is intended by way of the foregoing description and the accompanying drawings, except as set forth in the appended claims.

What is claimed is:

1. A method of forming a channeled wall thrust nozzle defining a converging-diverging thrust chamber, said method comprising the steps of:

forming a mandrel having a longitudinal converging-diverging cross-section and a transverse cross-section generally conforming respectively with the geometry of the thrust chamber to be formed, the mandrel being transversely split at a narrow diameter throat of the converging-diverging cross-section, thereby defining longitudinally separable mandrel components, said mandrel forming step further including forming an array of longitudinally extending slots in an exterior surface of the mandrel;

seating a plurality of channel separator ribs individually within the mandrel slots which project outwardly therefrom, thereby defining a plurality of longitudinally extending channels between the ribs;

filling the channels with a removable casting material;

mounting an outer housing shell to outboard edge margins of the channel separator ribs, thereby enclosing outboard sides of the channels;

removing the mandrel from the channel separator ribs by longitudinally separating the mandrel components;

tailoring inboard edge margins of the channel separator ribs to a selected geometry;

mounting an inner housing shell to the inboard edge margins of the channel separator ribs, thereby enclosing inboard sides of the channels; and removing the casting material from the channels.

2. The method of claim 1 wherein said mandrel forming step includes forming the mandrel to have a generally circular transverse cross-section.

3. The method of claim 2 wherein said mandrel forming step includes forming the slots in a circumferential array about the exterior of the mandrel to have a generally uniform size, shape, and spacing.

4. The method of claim 2 wherein said mandrel forming step includes forming the slots to follow the converging-diverging contour of the mandrel with substantially uniform slot depth.

5. The method of claim 1 further including the step of forming the channel separator ribs from metal sheet stock such that the inboard and outboard edge margins conform generally with the converging-diverging contour of the mandrel, and a sufficient width between the inboard and outboard edge margins projects radially outwardly from the mandrel when the ribs are seated in the mandrel slots.

6. The method of claim 1 wherein the casting material comprises a casting wax.

7. The method of claim 1 further including, the step of machining the outboard edge margins of the channel separator ribs to a selected converging-diverging longitudinal geometry subsequent to said filling step.

8. The method of claim 7 wherein said machining step includes bridging at least slightly into the casting material.

9. The method of claim 1 further including the step of applying a release agent to the exterior of the mandrel to facilitate said mandrel removing step.

10. The method of claim wherein said inboard edge margin tailoring step comprises machining the inboard edge margins of the channel separator ribs to bridge at least partially into the casting material.

11. The method of claim 1 wherein said steps of mounting the outer and inner housing shells comprise electrodeposition steps.

12. A method of forming a channeled wall thrust nozzle defining a converging-diverging thrust chamber, said method comprising the steps of:

providing a mandrel having a longitudinal converging-diverging cross-section conforming generally with the converging-diverging geometry of the thrust chamber to be formed, a generally circular transverse cross-section having a diametric size slightly less than the diametric size of the thrust chamber to be formed, a transverse split at a narrow diameter throat thereby defining longitudinally separable mandrel components, and an exterior array of circumferentially spaced and longitudinally extending slots each having a longitudinal profile conforming generally with the converging-diverging geometry of the thrust chamber to be formed;

seating a plurality of channel separator ribs individually into the slots which project radially outwardly from the slot, the ribs having inboard and outboard edge margins conforming generally to the converging-diverging geometry of the thrust chamber to be formed and defining therebetween a circumferentially spaced plurality of longitudinal channels;

filling the channels with a removable casting material;

mounting an outer housing shell to the outboard edge margins of the channel separator ribs;

removing the mandrel from the channel separator ribs and the casting material by longitudinally separating the mandrel components;

tailoring the inboard edge margins of the channel separator ribs to a selected geometry conforming generally with the converging-diverging geometry of the thrust chamber to be formed, said tailoring step including machining at least slightly into the casting material;

mounting an inner housing shell to the inboard edge margins of the channel separator ribs; and removing the casting material from the channels 13. The method of claim 12 further including the step of forming the channel separator ribs from metal sheet stock.

14. The method of claim 12 wherein the casting material comprises a casting wax.

15. The method of claim 12 further including the step of machining the outboard edge margins of the channel separator ribs to a selected converging-diverging longitudinal geometry subsequent to said filling step.

16. The method of claim 12 further including the step of applying a release agent to the exterior of the mandrel to facilitate said mandrel removing step.

17. The method of claim 12 wherein said steps of mounting the outer and inner housing shells comprise electrodeposition steps.

18. The method of claim 12 further including mounting fluid flow manifolds to said inner and outer housing shells for circulating a selected fluid through the channels.

* * * * *

UNITED STATES PATENT AND TRADEMARK OFFICE
CERTIFICATE OF CORRECTION

PATENT NO. : 4,942,653

DATED : July 24, 1990

INVENTOR(S) : Elden L. Hawkinson

It is certified that error appears in the above-identified patent and that said Letters Patent is hereby corrected as shown below:

In the Claims:

Column 6, Claim 7, Line 61 - Delete the comma after the word "including".

Column 7, Claim 10, Line 4 - Insert --1-- after the word "claim".

Column 7, Claim 12, Line 21 - Insert a comma after the word "throat".

Column 7, Claim 12, Line 30 - Replace the word "slot" with the word --slots--.

Column 8, Claim 12, Line 16 - Add a period after the word "channels" at the end of the claim.

Signed and Sealed this

Fifth Day of November, 1991

Attest:

HARRY F. MANBECK, JR.

*Attesting Officer*  *Commissioner of Patents and Trademarks*